No. 633,301. Patented Sept. 19, 1899.
C. WEGENER.
FURNACE FOR CONSUMING HOUSEHOLD REFUSE, &c.
(Application filed Apr. 22, 1899.)
(No Model.)
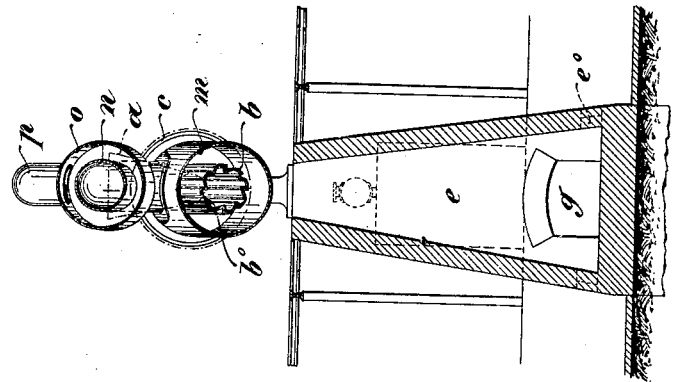
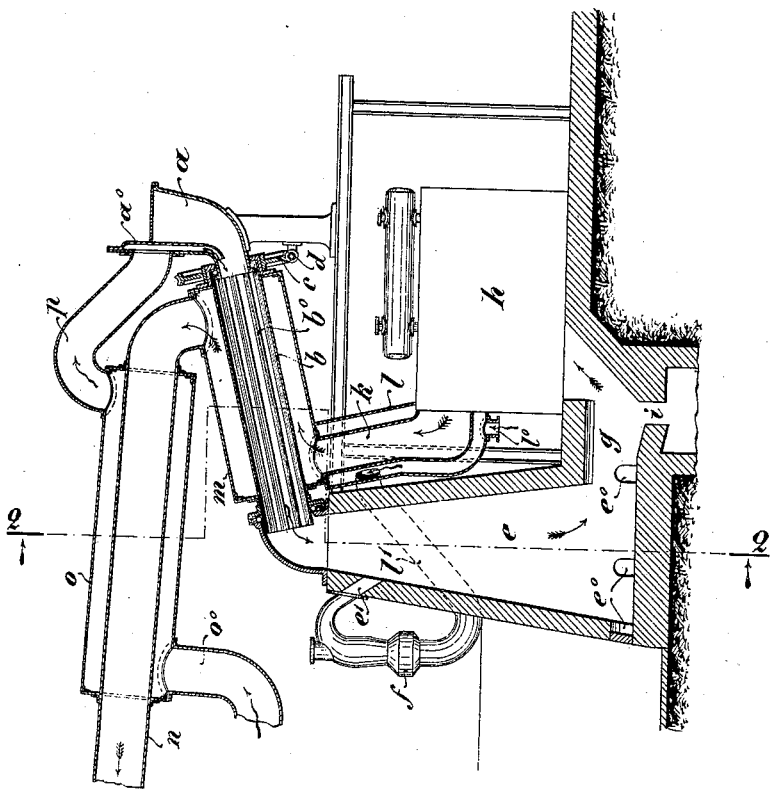

UNITED STATES PATENT OFFICE.

CARL WEGENER, OF BERLIN, GERMANY.

FURNACE FOR CONSUMING HOUSEHOLD REFUSE, &c.

SPECIFICATION forming part of Letters Patent No. 633,301, dated September 19, 1899.

Application filed April 22, 1899. Serial No. 714,004. (No model.)

*To all whom it may concern:*

Be it known that I, CARL WEGENER, a subject of the King of Prussia, German Emperor, and a resident of Berlin, Prussia, German Empire, have invented new and useful Improvements in Furnaces for Consuming Household Refuse and Similar Materials, of which the following is a specification.

The invention consists of a furnace in which household refuse and similar materials can be burned or smelted by being charged from a rotating cylinder heated by the combustion-gases into the furnace, which is highly heated by direct heating—as, for instance, by coal-dust-firing apparatus.

The incombustible portion of the refuse will, as a rule, fall upon the sole of the furnace in the melted state, while the combustible portion, if a sufficient supply of air be admitted, will also be burned during its descent. The melted slag and the heated gases produced both from the fuel and the combustible part of the refuse are preferably allowed to escape through one and the same opening close to the sole of the furnace and the too sudden cooling and hardening of the slag thus guarded against by keeping it in contact with the gases of combustion as long as possible.

A practically important development is given to the invention by the device for the delivery of the refuse into the furnace, consisting of a hollow cylinder or cone, around which are conducted the combustion-gases and which is placed at an angle and revolves slowly upon its axis. The inner surface of the cylinder which serves for transporting the refuse to the furnace may be provided with ribs, paddles, or other similar carrying devices. By this means the refuse fed through a hopper into the cylinder is mixed and the contents of the refuse in ashes loosened and opened up. These ashes are delivered into the furnace in the form of dry dust and are consequently more quickly melted.

In the accompanying drawings, Figure 1 is a longitudinal vertical section of a refuse-furnace embodying the present invention, and Fig. 2 is a cross-section of the same on the line 2 2 of Fig. 1.

The rubbish placed in the hopper $a$ passes from this into the rotating cylinder $b$, which is provided with longitudinal ribs $b^°$. The revolution of the cylinder is effected by the worm-wheel and worm $c$ and $d$, to which latter a quicker or slower motion may be imparted, according to the condition of the furnace. From the lower end of the cylinder $b$ the refuse is delivered into the furnace $e$, which is provided on a level with its floor with small openings $e^°$, so that when necessary the masses of material collected on the floor of the furnace may be stirred up.

For the direct heating of the furnace an apparatus $f$ is provided, which delivers a mixture of coal-dust and air through the opening $e'$ into the furnace. From the outlet-opening $g$, leading from furnace $e$, the combustion-gases pass to the boiler $h$, while the slag runs off through the opening $i$, where it is formed into a block or collected in vessels which for the purpose of increasing their durability and for the quicker cooling of the slag may be provided with a water-jacket. The combustion-gases leaving the boiler $h$ are further utilized in the flue $k$, which is inclosed by a jacket $l$, provided at its lower end with an opening $l^°$, through which the atmospheric air enters the jacket $l$, the air being heated by the combustion-gases in flue $k$ and part thereof escaping through a tube $l'$, leading from jacket $l$ to the delivery apparatus $f$ of the coal-dust-firing apparatus. The flue $k$ delivers into a jacket $m$, surrounding the rotating cylinder $b$, so that also this cylinder is heated by the combustion-gases. To the jacket $m$ the flue $n$ is attached, which flue is also inclosed throughout a portion of its length by a jacket $o$, a space being provided between the two which is supplied with atmospheric air by a tube $o^°$, which may be provided with a throttle-valve, the temperature of the air entering jacket $o$ being raised by the combustion-gases in the flue $n$ and the air thus heated passing from the jacket $o$ through a tube $p$ into a chamber $a^°$, formed in the hopper $a$ and opening toward the rotating cylinder $b$. The delivery of the previously-heated air into the cylinder $b$ not only supports the drying and dry distillation taking place within the latter, but conveys the gases and vapors escaping during this operation with certainty back into the furnace $e$, where they take part in the combustion, owing to the extraordinary high temperature prevailing there, so that the production of noxious smells may be with certainty avoided.

What I claim is—

The combination of a furnace, a rotating feeding-cylinder, a jacket surrounding the feeding-cylinder, and an air-heating flue-jacket communicating with the inlet end of the feeding-cylinder, the exit-flue of the furnace having communication with the jacket surrounding the feeding-cylinder and arranged to heat the air in the air-heating flue-jacket, substantially as and for the purpose described.

In testimony whereof I have hereunto set my hand in presence of two subscribing witnesses.

CARL WEGENER.

Witnesses:
WALDEMER HAUPT,
HENRY HASPER.